US012703784B2

(12) United States Patent
Hahn et al.

(10) Patent No.: US 12,703,784 B2
(45) Date of Patent: Aug. 11, 2026

(54) TIRE TREAD RUBBER COMPOSITION COMPRISING RICE HUSK ASH SILICA

(71) Applicant: THE GOODYEAR TIRE & RUBBER COMPANY, Akron, OH (US)

(72) Inventors: Bruce Raymond Hahn, Hudson, OH (US); George Jim Papakonstantopoulos, Medina, OH (US); Xiaoping Yang, Streetsboro, OH (US); Kuo-Chih Hua, Richfield, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 669 days.

(21) Appl. No.: 18/071,989

(22) Filed: Nov. 30, 2022

(65) Prior Publication Data

US 2023/0174743 A1 Jun. 8, 2023

Related U.S. Application Data

(60) Provisional application No. 63/285,164, filed on Dec. 2, 2021.

(51) Int. Cl.
*C08K 3/36* (2006.01)
*C08L 9/06* (2006.01)
*B60C 1/00* (2006.01)

(52) U.S. Cl.
CPC *C08K 3/36* (2013.01); *C08L 9/06* (2013.01); *B60C 1/0016* (2013.01)

(58) Field of Classification Search
CPC ... C08K 3/36; C08L 9/06; C08L 15/00; B60C 1/0016
See application file for complete search history.

(56) References Cited

U.S. PATENT DOCUMENTS 3,842,111 A 10/1974 Meyer-Simon
3,873,489 A 3/1975 Thurn et al.
(Continued)

FOREIGN PATENT DOCUMENTS

EP 2794287 A1 10/2014
EP 3378892 A1 9/2018
WO WO-2006076670 A2 * 7/2006 .......... B60C 1/0016

OTHER PUBLICATIONS

Extended European Search Report dated Apr. 11, 2023 for European Patent Application 22209718.0.

*Primary Examiner* — Doris L Lee
(74) *Attorney, Agent, or Firm* — Alvin T. Rockhill

(57) ABSTRACT

This invention is based upon the unexpected discovery that rice husk ash silica (synthetic amorphous silica from rice husk ash) provides an exceptionally good combination of properties when used in certain tire tread rubber formulations, such as an excellent combination of traction, treadwear, and rolling resistance. These tread rubber formulations are comprised of a blend of high cis-1,4-polybutadiene rubber and a solution styrene-butadiene rubber which is preferably functionalized with amine groups, siloxy groups, thiol groups, carboxyl groups, or groups that are reactive with hydroxyl groups present on the precipitated rice husk ash silica. The use of such rice husk silica as a reinforcing-filler in rubber formulations is also highly desirable because such silica is a sustainable resource (bio-renewable) which is derived from an agricultural waste material which would otherwise be discarded as an undesirable waste product.

15 Claims, 1 Drawing Sheet

FLOW CHART OF PRECIPITATED SILICA

(56) References Cited

U.S. PATENT DOCUMENTS

| | | | | |
|---|---|---|---|---|
| 3,951,907 | A * | 4/1976 | Mehta | C08K 3/36 106/407 |
| 3,978,103 | A | 8/1976 | Meyer-Simon et al. | |
| 5,405,985 | A | 4/1995 | Parker et al. | |
| 5,663,396 | A | 9/1997 | Musleve | |
| 6,172,251 | B1 | 1/2001 | Parker | |
| 6,294,683 | B1 | 9/2001 | Johnson | |
| 6,433,065 | B1 * | 8/2002 | Lin | B29B 7/7495 524/495 |
| 7,585,481 | B2 | 9/2009 | Dodson | |
| 7,687,107 | B2 | 3/2010 | Okel et al. | |
| 7,704,552 | B2 | 4/2010 | Okel et al. | |
| 9,938,154 | B2 | 4/2018 | Clouin et al. | |
| 2002/0081247 | A1 | 6/2002 | Dodson | |
| 2002/0107316 | A1 * | 8/2002 | Bice | C09C 1/309 423/625 |
| 2005/0209413 | A1 * | 9/2005 | Labauze | C08L 91/00 525/333.3 |
| 2017/0057285 | A1 * | 3/2017 | Sandstrom | C08L 15/00 |

* cited by examiner

FLOW CHART OF PRECIPITATED SILICA
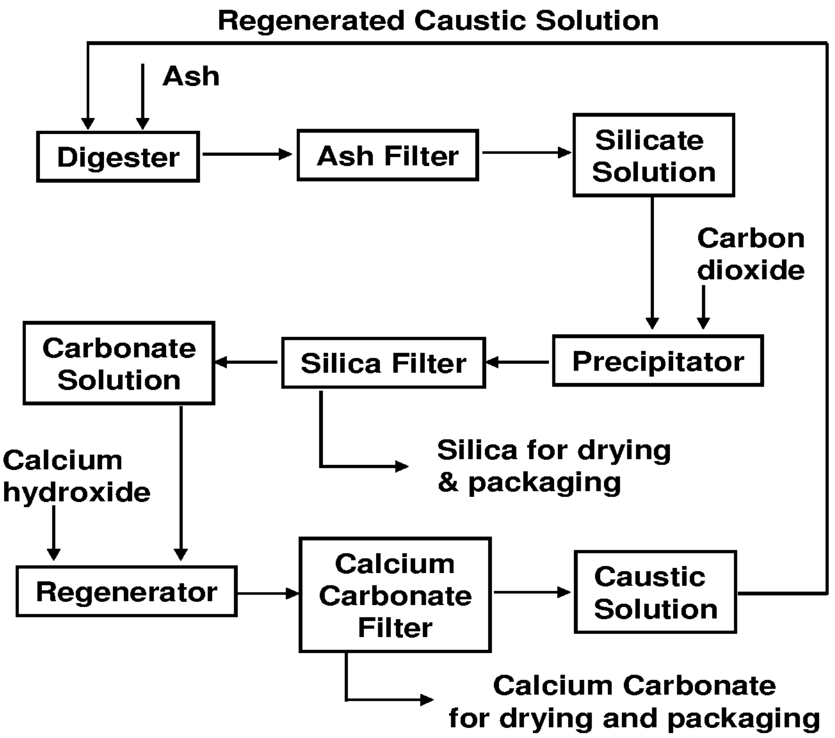

TIRE TREAD RUBBER COMPOSITION COMPRISING RICE HUSK ASH SILICA

This application claims benefit of U.S. Provisional Patent Application Ser. No. 63/285,164, filed on Dec. 2, 2021. The teachings of U.S. Provisional Patent Application Ser. No. 63/285,164 are incorporated herein by reference in their entirety.

BACKGROUND OF THE INVENTION

One or more fillers, such as carbon black or silica, are normally included in rubber formulations to attain desired physical properties. For instance, the rubber compositions used in tires, hoses, power transmission belts, conveyor belts, and a wide variety of other rubber products, normally contain one or more fillers. Carbon black has traditionally been used as a reinforcing-filler in manufacturing such rubber products. However, there is a growing trend toward utilizing silica or a combination of silica and carbon black in rubber formulations, such as tire tread formulations, to attain improved physical properties, such as wet traction characteristics and tread life without sacrificing rolling resistance (fuel economy). Finely ground synthetic amorphous silica (SAS) also offers the advantages of being abundant and widely available at a competitive cost.

Synthetic amorphous silica can be made by a wide variety of techniques. For instance, it can be made by sodium silicate precipitation, silicon tetrachloride ($SiCl_4$) pyrolysis, extraction from agricultural waste, or the physical deposition of silicon vapor. Differences in the characterization of each material are related to the principles and techniques involved in their manufacture. As reported by Dr. Rafael Salomão et al, Characterization of Synthetic Amorphous Silica (SAS) Used in the Ceramics Industry, InterCeram: International Ceramic Review 63(4):220 (August 2014), the method and conditions under which the silica is made strongly influence its composition, physico-chemical properties, thermal characteristics, microstructure and physical properties.

As is explained in Salomão's publication, the production of silica by precipitation from sodium silicate (water glass) is carried out by reacting sodium carbonate ($Na_2CO_3$) and finely ground quartz (crystalline $SiO_2$) at an elevated temperature which is typically within the range of 1400° C. to 1500° C. which yields sodium silicate ($nSiO_2 \cdot Na_2O$) according to the following formula:

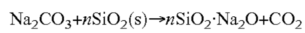

$$Na_2CO_3 + nSiO_2(s) \rightarrow nSiO_2 \cdot Na_2O + CO_2$$

In another method sodium silicate can be made by dissolving sand ($SiO_2$) with sodium hydroxide (NaOH) under hydrothermal conditions. In the case of this procedure, a filtering process is required for removal of undissolved $SiO_2$. In both cases, the Na/Si ratio is kept above 3 to yield orthosilicate ($Na_4SiO_4$) and a ratio of about 2 is used to produce metasilicate ($Na_2SiO_3$). In any case, when sodium silicate is dissolved in water silicic acid is produced by the reaction:

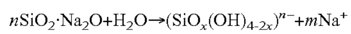

$$nSiO_2 \cdot Na_2O + H_2O \rightarrow (SiO_x(OH)_{4-2x})^{n-} + mNa^+$$

Silica particles or nanoparticles are then precipitated by treating the silicic acid solution with a strong acid, such as hydrochloric acid ($H_2SO_4$) or nitric acid ($HNO_3$), according to the reaction:

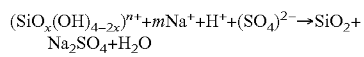

$$(SiO_x(OH)_{4-2x})^{n+} + mNa^+ + H^+ + (SO_4)^{2-} \rightarrow SiO_2 + Na_2SO_4 + H_2O$$

The sodium salt ions in solution are removed by filtration, dialysis or centrifugation and solid $SiO_2$ particles are recovered, dried, and milled. As in any soluble salt precipitation method, parameters, such as the concentration of reactants, pH change rate, temperature, stirring and presence of impurities can affect the characteristics of the resulting particles. Generally, the faster the precipitation, the more intense the nucleation and aggregation of nanoparticles will be which generates coarser porous structures. The drying of the nanoparticles in suspension also affects their final morphology. The precipitated particles tend to form large agglomerates that are reduced by mechanical milling to generate angular shapes. The purification step conducted after precipitation does not completely remove sodium ions (Na+) and other ions created in the process. Hence, purity levels of less than 98% are typically realized.

Particles of synthetic amorphous silica of much higher purity than can be made by sodium silicate precipitation are produced by silicon tetrachloride ($SiCl_4$) pyrolysis. The silicon tetrachloride ($SiCl_4$) is normally produced by a silicon or ferrosilicon particulate precursor being reacted with chlorine gas according to the reaction:

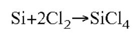

$$Si + 2Cl_2 \rightarrow SiCl_4$$

The $SiCl_4$ is burned by a hydrogen (H)—oxygen ($O_2$) oxidant flame at 1500° C. in accordance with the reaction:

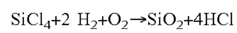

$$SiCl_4 + 2\ H_2 + O_2 \rightarrow SiO_2 + 4HCl$$

The high temperature at which this reaction is conducted sinters the small silicate products together which produces silica aggregates having high specific surface areas which is typically within the range of 100-400 $m^2/g$. These particles are continuously produced and exhibit silica content as high as 99.9% due to the high purity of the reactants utilized in the process.

In the physical deposition of silicon vapor a combination of natural silica (quartz), coal, coke, and wood chips is used to produce silicon (Si), ferrosilicon and related alloys. More specifically, these materials are reacted with oxygen in an electric furnace at temperatures above 2000° C. at which the carbon present reacts with oxygen to produce silicon in accordance with the reaction:

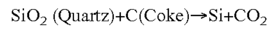

$$SiO_2\ (Quartz) + C(Coke) \rightarrow Si + CO_2$$

As a result of the high temperature employed, a significant amount of silicon vapor oxidizes and generates particles of amorphous silica which is known as silica fume or microsilica. An important characteristic of these particles is that they are spherical and of a high density with virtually no meso/macro porosity. This morphology is exhibited because of the high temperature of the process. In comparison to other types of synthetic amorphous silica, silica fume usually displays a smaller specific surface area (about 10 $m^2/g$ to 30 $m^2/g$), lower purity (90-95 mass % of $SiO_2$) and a larger average particle size (50 nm to 200 nm).

Synthetic amorphous silica can also be made by precipitation from various agricultural waste products from plants which use silica nanostructures as structural elements of their tissue. These waste materials are useful in the production of silica if their carbon content is removed to produce an ash which is comprised of predominantly amorphous silica with a carbon content of less than about 3%. For instance, silica can be extracted from bamboo leafs (bamboo culm), corncob ash, sugarcane bagasse, palm ash, rice husk ash, mustard husk ash, wheat chaff, straw, and a variety of other types of agricultural waste (see N Sapawe, MF Hanafi, Production of Silica from Agricultural Waste, Arc Org Inorg Chem Sci 3(2), 2018). The level of silica present in some of these agricultural waste products can be extremely high. For instance, palm ash is reported to contain 45% to 50% silica and mustard husk ash has been reported to contain 90% to as high as 98% silica (see D. Mittal, Silica from Ash, Resonance 2(7):64-66 (1997)). Rice has a natural skeleton which is comprised of cellulose, hemicellulose, lignin, and typically from about 10 to 18 mass percent silica-rich minerals. Rice husk is an agricultural residue abundantly available in rice producing countries. The annual rice husk production in India alone is approximately 12 million tons. Rice husk is typically not used as cattle feed since its cellulose and other sugar contents are low. Accordingly, rice husk is widely available in large quantities for silica extraction in many countries including, India, China, Brazil, and the United States.

Silica can be extracted from agricultural waste products using a variety of techniques. As a general rule, such agricultural waste having a high silica content is initially leached with an acid solution, such as a 10% acetic acid or citric acid in a hydrothermal reactor at a temperature which is within the range of about 100° C. to about 120° C. and at a pressure which is within the range of about 98 kPa to about 147 kPa. In the case of rice husks this treatment spreads the cellulosic fibers in the husks and softens their lignin cover, enabling a faster and more effective withdrawal of impurities, such as sodium, calcium and iron. After a neutralization step which can be accomplished by the addition of ammonium hydroxide ($NH_4OH$), the husk pulp is vacuum-filtered and dried. The dried husks are then calcined at an elevated temperature which is within the range of about 500° C. to about 700° C. for removal of organic matter. The use of an oxidizing atmosphere prevents the formation of silicon carbode (SiC) or coke. Specific surface area levels which are within the range of 120 $m^2/g$ to 400 $m^2/g$, a silica content above 99 mass percent, and process efficiency levels of higher than 90% can be achieved.

Billions of pounds of precipitated silica or amorphous silica are produced annually by the acidification of solutions of sodium silicate. In this process the gelatinous precipitate or silica gel is first washed and then dehydrated to produce colorless microporous silica. The idealized equation involving a trisilicate and sulfuric acid can be depicted as follows:

Rice hulls are an example of an agricultural waste material which is particularly useful in producing amorphous silica due it its low carbon contain. Additionally, the use of rice hull ash silica in rubber formulation is desirable because it makes good use of a valueless waste material. United States Patent Application Publication Number 2002/0081247 describes a method of making amorphous silica ash from waste materials including rice hull. This method includes the steps of: feeding exothermic siliceous material into a mixing zone for eventual discharge through an ash outlet; creating a gas stream consisting of inner and outer vortices about a common axis and containing sufficient oxygen for exothermic combustion of the feed material, the vortices meeting in the mixing zone to carry the feed material axially in the inner vortex with a centrifugal force component to cause the material to move outwardly from the inner vortex into the outer vortex so that the material is entrapped in the gas stream and passed repeatedly through the mixing zone until the feed material is converted primarily to amorphous silica ash having escape criteria needed to remain in the inner vortex to carry the ash to ash outlet for passage through the ash outlet; collecting spent gas at a spent gas outlet; monitoring the temperatures in the gas stream; comparing the temperatures in the gas stream with known information to provide an output signal; and using the output signal to control the maximum temperatures in the gas stream to result in a predominantly amorphous silica ash. U.S. Pat. No. 7,585,481 describes a similar process for producing amorphous silica ash from rice hull ash.

Other techniques can also be used in making pre-hydrophobated precipitated silica on a commercial basis. In most cases this involves a three step process. The first step is a precipitation step wherein sodium silicate solution (water glass) is reacted to produce a slurry of amorphous silica particles. In most cases the silica coupling agent is added during or immediately after the precipitation step. At this point the concentration of silica is about 5 to 6 weight percent. Then the treated precipitated silica slurry is concentrated into a filter cake. As the final step of the process the silica filter cake is dried, typically by spray drying, which affects the final filler morphology and brings the product moisture content to the desired level.

The silica used as a reinforcing-filler for rubber formulations is conventionally made by the Rhodia process. This process is described in greater detail in U.S. Pat. No. 9,938,154. This patent more specifically describes a process for preparing precipitated silica, the process comprising: precipitating a silicate and at least one acid using the following steps, whereby a suspension of precipitated silica is obtained: (i) forming an initial stock comprising a silicate and an electrolyte, wherein a concentration of silicate ($SiO_2$) in said initial stock is less than 100 g/l and, optionally, wherein a concentration of electrolyte in said initial stock is less than 19 g/l, (ii) adding an acid to said stock to form a reaction medium, wherein said acid is added until a pH value of the reaction medium of at least 7.0 is obtained, wherein the acid used before reaching a gel point in the reaction medium is sulfuric acid having a concentration of less than 20% by weight and wherein the acid used after reaching a gel point in the reaction medium is sulfuric acid having a concentration of at least 80% by weight, (iii) simultaneously adding sulfuric acid having a concentration of at least 80% by weight and a silicate to the reaction medium, (iv) adding sulfuric acid having a concentration of at least 80% by weight to the reaction medium, optionally until a pH value of the reaction medium of which is within the range of 3.0 to 6.5 is obtained, separating a precipitate from the reaction medium, and drying the precipitate.

A silica coupling agent is normally employed in rubber compounds that utilize silica as a reinforcing filler in order to attain better compatibility with the rubber and to attain more optimal physical characteristics. Hydrophobating silanes and sulfur containing crosslinkable silanes can be beneficially used as the silica coupling agent. For instance, various sulfur containing organosilicon compounds are useful as reactive silica coupling agents. A wide variety of hydrophobating silane compounds can also be beneficially employed. In any case, the use of such organosilicon compounds in silica containing rubbers improves physical properties by coupling the silica filler to the rubber.

U.S. Pat. Nos. 3,842,111, 3,873,489 and 3,978,103 disclose the preparation of various sulfur containing organosilicon compounds. These organosilicon compounds are prepared by reacting (1) 2 moles of a compound of the formula Z-Alk-X, wherein X is a halogen selected from the group consisting of chlorine, bromine or iodine; wherein Z represents:

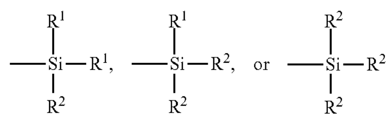

wherein $R^1$ is an alkyl group containing from 1 to 4 carbon atoms or a phenyl group and wherein $R^2$ is an alkoxy group containing from 1 to 8 carbon atoms, a cycloalkoxy group containing from 5 to 8 carbon atoms or an alkylmercapto group containing from 1 to 8 carbon atoms, wherein Alk is a divalent aliphatic hydrocarbon, an unsaturated hydrocarbon or a cyclic hydrocarbon containing 1 to 18 carbon atoms; with (2) 1 mole of a compound of the formula $M_2S_n$, wherein M is an ammonium group or a metal atom and n is a whole number from 2 to 6. Since the two starting materials are liquid, the reaction can take place in the absence of a solvent; however, the utilization of a volatile inert organic solvent is preferred and accordingly such an inert organic solvent is generally used. The reaction is carried out with the exclusion of water. The reason for the exclusion of water is to avoid the alkaline hydrolysis reaction of the silyl alkoxy groups which will ultimately lead to insoluble polymeric by-products and lower the overall yield of desired product. Aliphatic alcohols, such as methanol, ethanol, iso-propyl alcohol, normal-propyl alcohol, n-butanol, iso-butanol and t-butyl alcohol are representative examples of suitable inert organic solvents. At the end of the reaction between the two starting materials, the separated salt is removed by filtration. The filtrate is then freed from the solvent by distillation under vacuum. Unfortunately, this process is difficult to carry out on a commercial basis for a variety of reasons. For instance, most alcohols that are suitable for utilization as the solvent are difficult to obtain and maintain in a water-free (anhydrous) state. Additionally, most suitable alcohols, such as ethyl alcohol, have a low flash point which is highly undesirable in commercial applications.

U.S. Pat. No. 5,405,985 relates to a process for the production of organosilicon compounds of the formula: Z-Alk-Sn-Alk-Z, wherein Z is selected from the group consisting of

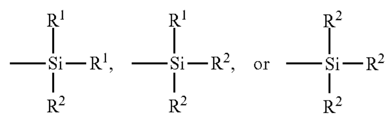

wherein $R^1$ is an alkyl group of 1 to 4 carbon atoms, a cyclohexyl group, or a phenyl group; wherein $R^2$ is an alkoxy group containing from 1 to 8 carbon atoms or cycloalkoxy containing from 5 to 8 carbon atoms; wherein Alk represents a divalent hydrocarbon of 1 to 18 carbon atoms, and wherein n is an integer of 2 to 8; comprising reacting (A) a compound of the formula: Z-Alk-X, wherein X represents Cl, Br or I; with (B) a compound of the formula: $Me_2S_n$, wherein where Me is an ammonium ion or an alkali metal ion; and wherein the reaction is conducted in the presence of a phase transfer catalyst and an aqueous phase.

U.S. Pat. No. 5,468,893 relates to a process for the production of organosilicon compounds of the formula: Z-Alk-Sn-Alk-Z. wherein Z is selected from the group consisting of:

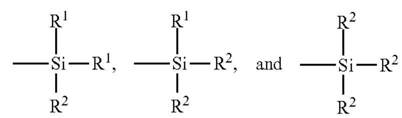

wherein $R^1$ is an alkyl group containing 1 to 4 carbon atoms, a cyclohexyl group, or a phenyl group; wherein $R^2$ is an alkoxy group containing from 1 to 8 carbon atoms or cycloalkoxy group containing from 5 to 8 carbon atoms; wherein Alk is a divalent hydrocarbon containing from 1 to 18 carbon atoms, and n is an integer of 2 to 8; comprising reacting (A) a compound of the formula Z-Alk-X, wherein X is Cl, Br or I; with (B) a compound of the formula $Me_2S_n$, wherein Me is ammonium or an alkali metal; and wherein the reaction is conducted in the presence of a phase transfer catalyst, an aqueous phase and a salt of the formula: XY or $X_2SO_4$, wherein X is selected from the group consisting of Li, Na, K, Rb and Cs; and wherein Y is selected from the group consisting of F, Cl and Br.

U.S. Pat. No. 5,663,396 discloses a process for the production of organosilicon compounds of the formula relates to a process for the production of organosilicon compounds of the formula: Z-Alk-Sn-Alk-Z wherein Z is selected from the group consisting of:

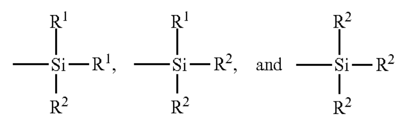

wherein $R^1$ is an alkyl group containing 1 to 4 carbon atoms, a cyclohexyl group, or a phenyl group; wherein $R^2$ is an alkoxy group containing from 1 to 8 carbon atoms or cycloalkoxy group containing from 5 to 8 carbon atoms; wherein Alk is a divalent hydrocarbon containing from 1 to 18 carbon atoms, and n is an integer of 2 to 8; comprising (A) reacting sodium hydroxide with sulfur in the presence of a saturated NaCl aqueous solution to form a reaction mixture; and (B) reacting said reaction mixture with a compound of the formula: Z-Alk-X, wherein X is Cl or Br, in the presence of a phase transfer catalyst.

U.S. Pat. Nos. 6,172,251 and 6,294,683 disclose a technique for reacting a first liquid chemical compound with a second liquid chemical compound which comprises (1) supporting the first liquid chemical compound on a solid support; (2) subsequently bringing the solid support into contact with the second liquid chemical compound; and (3) allowing the first chemical compound to react with the second chemical compound in the presence of a phase transfer catalyst to produce a reaction product. This technique is particularly useful in the synthesis of sulfur containing organosilicon compounds of the formula Z-Alk-$S_n$-Alk-Z, wherein Z is selected from the group consisting of

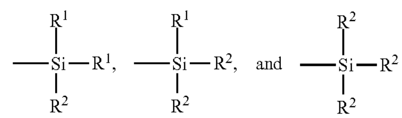

wherein $R^1$ is an alkyl group of 1 to 4 carbon atoms, cyclohexyl or phenyl; wherein $R^2$ is alkoxy group of 1 to 8 carbon atoms, cycloalkoxy group of 5 to 8 carbon atoms or an alkylmercapto group of 1 to 8 carbon atoms; wherein Alk is a divalent hydrocarbon of 1 to 18 carbon atoms; and wherein n is an integer of 2 to 8. It is indicated that such sulfur containing organosilicon compounds can be made by reacting aqueous solutions of various polysulfidic anions in saturated sodium chloride brine solutions with chloropropyltriethoxysilane (CPTES) supported on carbon black in the presence of a phase transfer catalyst.

Rubber formulations which include silica and a silica coupling agent will typically be mixed utilizing a thermomechanical mixing technique. More specifically, the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The functionalized rubber, silica and sulfur containing organosilicon, and carbon black if used, are mixed in one or more non-productive mix stages. In any case, the sulfur vulcanizable rubber composition containing the silica coupling agent (such as a sulfur containing organosilicon compound), vulcanizable rubber, and generally at least part of the silica are subjected to a thermomechanical mixing step. The thermomechanical mixing step generally comprises a mechanical working in a mixer or extruder for a period of time suitable in order to produce a rubber temperature which is within the range of 140° C. to 190° C.

The appropriate duration of the thermomechanical working varies as a function of the operating conditions and the volume and nature of the components. For example, the thermomechanical working may be for a time duration which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It is normally more preferred for the rubber to reach a temperature which is within the range of about 155° C. to about 170° C. and to be maintained at said temperature for a period of time which is within the range of about 1 minute to about 10 minutes.

The thermomechanical working step adds time, labor, energy requirements, equipment requirements, and cost to the rubber formulating procedure. To eliminate the need for such a thermomechanical working step pre-hydrophobated precipitated silica was developed. For instance, U.S. Pat. No. 7,687,107 describes a process for producing a chemically modified siliceous filler by contacting an acidic aqueous suspension of amorphous precipitated silica with a coupling agent to form an acidic aqueous suspension of chemically modified precipitated silica, optionally in the presence of a surfactant and/or a water miscible solvent, and recovering said chemically modified filler, which comprises: (A) providing an acidic aqueous suspension of amorphous precipitated silica having a pH of 2.5 or less; (B) contacting the precipitated silica with a coupling agent comprising a combination of: (a) bis(alkoxysilylalkyl)polysulfide and (b) non-sulfur organometallic compound(s), the weight ratio of (a) to (b) being at least 0.05:1, under conditions that result in essentially complete hydrolysis of any alkoxy groups associated with the coupling agent, thereby to produce chemically modified precipitated silica; (C) raising the pH of the acidic aqueous suspension of chemically modified precipitated silica to from 3.0 to 10 with acid neutralizing agent that does not adversely affect the chemically modified precipitated silica; and (D) separating chemically modified precipitated silica from the aqueous phase while retaining in the aqueous phase substantially all of any alcohol by-product produced by hydrolysis of alkoxy groups associated with the coupling agent, said chemically modified precipitated silica having (i) a carbon content of greater than 1 weight percent, (ii) a sulfur content of greater than 0.1 weight percent, (iii) a Silane Conversion Index of at least 0.3, and (iv) a Standard Tensile Stress at 300 percent elongation of at least 7.0 when incorporated into a vulcanized rubber composition. U.S. Pat. No. 7,704,552 describes a similar technique.

Pre-hydrophobated precipitated silica is commercially available from PPG Industries and is sold as Agilon® 400 performance silica. It is characterized by a CTAB surface area of 140 $m^2/g$, a $N_2$ (BET-5) surface area of 75 $m^2/g$, a SH weight of 0.5%, a carbon weight of 4.0%, a pH of 5.6, and a micro-granule physical form. Agilon® 400 also contains sodium sulfate ($Na_2SO_4$) as a residual salt.

There is a continuing need for silica that will provide enhanced rubber performance characteristics when utilized as a reinforcing-filler in rubber formulations. For instance, it would be highly desirable to provide silica for use in tire tread formulations which offers enhanced tire traction characteristics and good tread-wear without increasing rolling resistance (which provides good fuel economy). It would also be highly for the silica to come from a renewable and sustainable source at a reasonable cost. Additionally, it is important for the silica to be capable of being incorporated into rubber formulations using conventional materials, standard procedures, and ordinary equipment. Moreover, it is important for the silica and the materials and agents employed in its use to be capable of being utilized without having an adverse environmental impact as compared to the use of conventional techniques. In other words, the silica should be capable of being used in an environmentally friendly manner.

SUMMARY OF THE INVENTION

The subject invention is based upon the unexpected discovery that rice husk ash silica (synthetic amorphous silica from rice husk ash) provides an exceptionally good combination of properties when used in certain tire tread rubber formulations. More specifically, its use has been unexpectedly found to provide an excellent combination of traction, tread-wear, and rolling resistance when used in tire tread rubber formulations. These tread rubber formulations are comprised of a blend of solution styrene-butadiene rubber and high cis-1,4-polybutadiene rubber. The styrene-butadiene rubber will preferably be functionalized with at least one functional group selected from amine groups, siloxy groups, silanol groups, thiol groups, carboxyl groups, or groups that are reactive with hydroxyl groups which are present on the precipitated rice husk ash silica.

The use of such rice husk silica as a reinforcing-filler in rubber formulations is also highly desirable because such silica is a bio-renewable and is derived from an agricultural waste material which would otherwise need to be thrown away as an undesirable waste product. Accordingly, rice husk silica is a sustainable resource which can be beneficially utilized as a reinforcing-filler in rubber formulations and additionally its reduces the level of agricultural waste which is dumped in landfills.

A silica coupling agent will normally be included in the rise husk ash silica containing rubber formulations of this invention. In a preferred embodiment a combination of a hydrophobating silane and a crosslinkable silane will be included in the rubber formulation. It is typically preferred for such rubber compounds to contain 2 phf to 12 phf of a hydrophobating silane and 0.5 phf to 3 phf of a crosslinkable silane.

The present invention more specifically relates to a polymer formulation which contains silica synthesized from rice husk ash using carbon dioxide as a precipitation agent. For example, the subject invention describes a polymer formulation which is comprised of (1) a polymeric material and (2) silica which is recovered from rice husk ash by digestion of the rice husk ash with a base to produce a sodium silicate solution and subsequently precipitating the silica from the sodium silicate solution by reducing the pH of the sodium silicate solution by the addition of carbon dioxide. These polymeric materials can be plastics, thermoplastic elastomers, or conventional rubbers (thermosets). The base employed in the digestion can conveniently be sodium hydroxide or another strong base.

The present invention also reveals a polymer formulation which contains silica which is synthesized from rice husk ash using carbon dioxide in a precipitation step as a precipitation agent and which is subsequently treated after being precipitated with a silane.

The subject invention further discloses a rubber formulation which is comprised of (1) a styrene-butadiene rubber, (2) a high-cis-1,4 polybutadiene rubber, (3) rice husk ash silica, and (4) a silica coupling agent.

The present invention also described a rubber formulation which is comprised of (1) a functionalized styrene-butadiene rubber, (2) a high-cis-1,4 polybutadiene rubber, (3) rice husk ash silica, and (4) a silica coupling agent.

The subject invention further reveals a rubber formulation which is comprised of (1) a styrene-butadiene rubber, (2) a high-cis-1,4 polybutadiene rubber, (3) rice husk ash silica, (4) 2 phf to 15 phf of a hydrophobating silane, and (5) 0.5 phf to 5 phf of a crosslinkable silane.

The subject invention also describes a tire which is comprised of a generally toroidal-shaped carcass with an outer circumferential tread which is adapted to be ground contacting, two spaced beads, at least one ply extending from bead to bead and sidewalls extending radially from and connecting said tread to said beads, wherein the circumferential tread is comprised of a sulfur cured rubber formulation which is comprised of a rubber formulation which is comprised of (1) a styrene-butadiene rubber, (2) a high-cis-1,4 polybutadiene rubber, (3) rice husk ash silica, and (4) a silica coupling agent.

BRIEF DESCRIPTION OF THE DRAWINGS

FIG. 1 shows the flow chart of the IPSIT process for the production of silica from rice husk ash with the major steps being digestion, ash filtration, precipitation, filtration of the silica, and regeneration of the spent solution.

DETAILED DESCRIPTION OF THE INVENTION

The rice husk ash silica utilized in the practice of this invention can be made in accordance with the teachings of United States Patent Application Publication Number 2002/0081247 A1 or U.S. Pat. No. 7,585,481 B2. The teachings of United States Patent Application Publication Number 2002/0081247 A1 and U.S. Pat. No. 7,585,481 B2 are incorporated herein by reference for the purpose of disclosing methods for making rice hull ash silica that can be utilized in accordance with this invention.

The rice husk ash silica that can be used in the practice of this invention can be an allyl functional precipitated silica which is comprised of a precipitated silica containing at least one allyl group substituent; wherein said precipitated silica has:

(A) a BET nitrogen surface area in a range of from 120 to 300 $m^2/g$, (B) a CTAB surface area in a range of from 100 to 300 $m^2/g$, with (C) a ratio of said BET/CTAB surface areas in a range of from 0.8 to 1.3; and wherein said allyl functionalized precipitated silica is represented by a general formula (I):

(I)

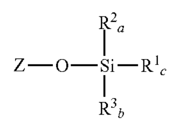

where Z represents the precipitated silica; $R^2$ and $R^3$ are the same or different radicals comprised of an alkyl group containing from 1 to 4 carbon atoms, a cycloalkyl group, a phenyl group, and alkene group containing from 3 to 18 carbon atoms or cycloalkene radical having from 5 to 8 carbon atoms; wherein $R^1$ is an allyl hydrogen containing hydrocarbon radical; where a is an integer in a range of from 0 to 2, wherein b is an integer in a range of from 0 to 2 and wherein c is an integer in a range of from 1 to 3.

In further accordance with this invention, at least one of $R^2$ and $R^3$ may be comprised of an hydroxyl group or a siloxy group. For this invention, because the Si moiety has a valence of 4, it is considered that the Z—O— units may inherently range from 1 to 3, depending upon the values of a, b and c. For example, if (c) equals 1 and both (a) and (b) equal zero, then Z—O— is comprised of 3 units.

Desirably, said allyl containing hydrocarbon radical is comprised of at least one of the following:

| | |
|---|---|
| $—CH_2—CH{=}CH_2$, | (allyl hydrocarbon radical) |
| $—CH_2—CH{=}CH—CH_3$, | (2-butene radical) |
| $—CH_2—CH{=}C—(CH_3)_2$ and | (dimethallyl hydrocarbon radical) |
| $—CH_2—C(CH_3){=}CH—CH_3$ | (2-methyl-2-butene radical) |

The method developed by the Indian Institute of Science Precipitated Silica Technology (IPSIT) in Bangalore represents an excellent method for extracting precipitated silica that can be used in accordance with this invention in a commercially viable way from rice husk ash. In using this technology for silica precipitation the chemicals used are regenerated making recycling possible. In implementing this process yields of about 70% have been reported, which amounts to a conversion level in the range of about 80% to 90% on silica in the ash. FIG. 1 shows the flow chart of the UPSIT process with the major steps being digestion, ash filtration, precipitation, filtration of the silica, and regeneration of the spent solution.

The digestion step in the IPSIT process involves the digestion of the rice husk ash with sodium hydroxide (caustic soda). In this process the silica in the ash is extracted with the caustic soda to form soluble sodium silicate solution. After the completion of the digestion the solution is filtered to remove residual undigested ash present in the solution. The clear filtrate is then recovered for precipitation. As a general rule, the quantity of silica extracted from the rice husk ash increases with increasing temperatures. The reaction taking place in the digestion step can be depicted as follows:

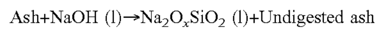

$$Ash+NaOH\ (l)\rightarrow Na_2O_xSiO_2\ (l)+Undigested\ ash$$

The precipitation step involves precipitation of silica from the sodium silicate solution from the digestion step. In this step carbon dioxide is pumped into the precipitator where it is passed through the silicate solution under conditions of continuous stirring. The decrease in the pH of the solution causes the silica to precipitate with the silica then being filtered and washed with water to remove the water soluble salts. The rice husk ash silica is then dried and the filtrate containing sodium carbonate is removed for regeneration. The reaction which takes place during the precipitation step is illustrated as follows:

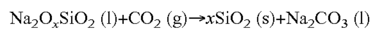

$$Na_2O_xSiO_2\ (l)+CO_2\ (g)\rightarrow xSiO_2\ (s)+Na_2CO_3\ (l)$$

In the regeneration step the calcium compound is reacted with the sodium carbonate to form calcium carbonate and sodium hydroxide. The filtrate from the precipitation stage is taken to a regenerator where the sodium carbonate present in the solution is converted to sodium hydroxide using calcium hydroxide. The resulting solution is filtered to remove the solid calcium carbonate and the aqueous sodium hydroxide is used in the digestion again. Regeneration of the sodium hydroxide is highly cost effective since it is a relatively expensive chemical compound. The calcium carbonate is washed with water and dried. The dried calcium carbonate can be either calcined to make calcium oxide, which is reused, for regeneration or the calcium carbonate is sold and fresh calcium hydroxide is used for regeneration. These reactions are depicted as follows:

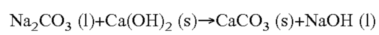

$$Na_2CO_3\ (l)+Ca(OH)_2\ (s)\rightarrow CaCO_3\ (s)+NaOH\ (l)$$

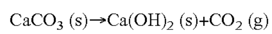

$$CaCO_3\ (s)\rightarrow Ca(OH)_2\ (s)+CO_2\ (g)$$

The use of carbon dioxide to lower the pH and to facilitate the precipitation of the silica in the precipitation step results in an amorphous silica product having exceptional properties for utilization as a reinforcing-filler for rubber formulations. Synthetic amorphous silica which is made by the IPSIT process (IPSIT silica) is a white fluffy powder, having a purity of greater than 98%, a surface area of 50 $m^2$/gm to 200 $m^2$/gm, a bulk density of 120 g/liter to 200 g/liter, a loss on ignition of 3.0% to 6.0%, a pH of about 5, and a heat loss of 4.0% to 7.0%.

The rubber formulations of this invention are comprised of a blend of styrene-butadiene rubber and cis-1,4-polybutadiene rubber. These blends typically contain from about 5 weight percent to about 50 weight percent of the cis-1,4-polybutadiene rubber and from about 50 weight percent to about 95 weight percent of the styrene-butadiene rubber. These blends preferably contain from about 10 weight percent to about 45 weight percent of the cis-1,4-polybutadiene rubber and from about 55 weight percent to about 90 weight percent of the styrene-butadiene rubber and more preferably contain from about 20 weight percent to about 40 weight percent of the cis-1,4-polybutadiene rubber and from about 60 weight percent to about 80 weight percent of the styrene-butadiene rubber. The rubber formulations of this invention will most preferably contain from about 25 weight percent to about 35 weight percent of the cis-1,4-polybutadiene rubber and from about 65 weight percent to about 75 weight percent of the styrene-butadiene rubber. The rubber formulations of this invention can also include other rubbery polymers, such as natural rubber and/or synthetic polyisoprene rubber, in amounts of up to about 30 weight percent.

The styrene-butadiene rubber utilized in the practice of this invention will typically have a bound styrene content which is within the range of 5 to 50 percent, preferably 9 to 36, percent, and most preferably 26 to 31 percent. The styrene-butadiene rubber can be emulsion styrene-butadiene rubber (ESBR) which is made by emulsion polymerization in an aqueous solvent or it can be solution styrene-butadiene rubber which is made by solution polymerization in an organic solvent. The styrene-butadiene rubber will preferably be a solution styrene-butadiene rubber. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. For instance, such styrene-butadiene rubber can be functionalized with amine groups, siloxy groups, thiol groups, carboxyl groups, or other groups that are reactive with hydroxyl groups which are present on the precipitated rice husk ash silica. In addition, or alternatively, the SSBR can be thio-functionalized. This helps to improve stiffness of the compound and/or its hysteresis behavior. Thus, for instance, the SSBR may be a thio-functionalized, tin-coupled solution polymerized copolymer of butadiene and styrene.

In one embodiment of this invention the styrene-butadiene rubber can be functionalized by grafting a functionalizing agent of the formula: $HS-A-(COOH)_n$, wherein A represents a hydrocarbyl group containing from 1 to 20 carbon atoms, and wherein n represents an integer from 1 to 3, wherein the COOH groups can be bonded to a single carbon atom or to multiple carbon atoms in the hydrocarbyl group, onto the rubber. Such functionalizing agents will generally contain from 1 to 20 carbon atoms, and will typically contain from 3 to 8 carbon atoms. The functionalizing agent will also typically contain 1 or 2 carboxyl groups. For instance, the functionalizing agent can be a compound of the formula HS-A-COOH, or a compound of the formula:

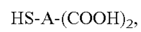

$$HS-A-(COOH)_2,$$

wherein A represents a hydrocarbyl group containing from 1 to 20 carbon atoms. In any case, the functionalizing agent is a compound that contains both a thiol group and at least one carboxylic acid group.

The functionalization can typically be accomplished by simply blending the functionalizing agent into the rubber and allowing the grafting to occur at an elevated temperature, such as the temperature which is normally reached during rubber mixing in a Banbury mixer or a mill mixer. This functionalization of the styrene-butadiene rubber can be carried out by simply reacting the styrene-butadiene rubber with the functionalizing agent to make a rubber having pendant groups of the structural formula: —S-A-COOH, wherein A represents a hydrocarbyl group containing from 1 to 20 carbon atoms. Amine functionalized styrene-butadiene rubber can be made via a method wherein the styrene-butadiene rubber is reacted with an agent of the formula: $HS-A-NH_2$ or $HS-A-(NH)_2$, again wherein A represents a hydrocarbyl group containing from 1 to 20 carbon atoms.

The high cis-1,4-polybutadiene rubber which can be used in the practice of this invention typically has a cis-1,4-microstructure content of at least 90%, preferably at least 95%, and more preferably of at least 97% or 98%. Suitable high cis-1,4-polybutadiene rubber is typically prepared by organic solution polymerization of 1,3-butadiene. The high cis-1,4-polybutadiene rubber used in the practice of this invention typically has a glass transition temperature (Tg) in a range of −95° C. to −105° C. Suitable high cis-1,4-polybutadiene rubbers which are available commercially from The Goodyear Tire & Rubber Company include Budene® 1207 high cis-1,4-polybutadiene rubber, Budene® 1208 high cis-1,4-polybutadiene rubber, and Budene® 1280 high cis-1,4-polybutadiene rubber. These high cis-1,4-polybutadiene rubbers can be synthesized utilizing nickle catalyst systems which include a mixture of (1) an organonickel compound, (2) an organoaluminum compound, and (3) a fluorine containing compound as described in U.S. Pat. Nos. 5,698,643 and 5,451,646. The teachings of U.S. Pat. Nos. 5,698,643 and 5,451,646 are incorporated herein by reference.

The silica coupling agent used in the practice of this invention can be a crosslinkable silica coupling agent. Such crosslinkable silica coupling agents can be sulfur containing compounds having one of the following structural of the formulas:

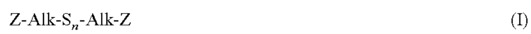

$$\text{Z-Alk-S}_n\text{-Alk-Z} \quad \text{(I)}$$

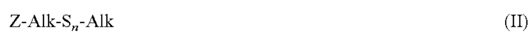

$$\text{Z-Alk-S}_n\text{-Alk} \quad \text{(II)}$$

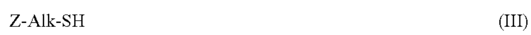

$$\text{Z-Alk-SH} \quad \text{(III)}$$

in which Z is selected from the group consisting of:

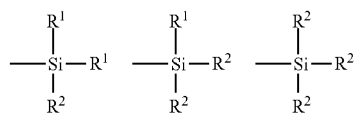

wherein $R^1$ is an alkyl group containing from 1 to 4 carbon atoms, a cyclohexyl group, or a phenyl group; wherein $R^2$ is an alkoxy group containing from 1 to 8 carbon atoms, or a cycloalkoxy group containing from 5 to 8 carbon atoms; wherein Alk is a divalent hydrocarbon of 1 to 18 carbon atoms and wherein n represents an integer from 2 to 8. The mercaptosilanes and blocked mercaptosilanes that can be used in the practice of this invention are described in International Patent Publication Number WO 2006/076670.

Specific examples of sulfur containing organosilicon compounds which may be used as the silica coupling agent in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec·butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec·butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl methylpropyl) tetrasulfide, 3,3'-bis(dimethoxyphenylsilyl-2-methylpropyl) disulfide, (3-mercaptopropyl) trimethoxysilane, (3-mercaptopropyl)triethoxysilane, and 3-(triethoxysilyl)propyl thiooctanoate.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore, with respect to formula I, Z is preferably

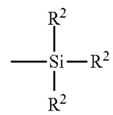

wherein $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

Some preferred sulfur containing crosslinkable silanes are of the structural formula:

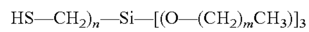

$$\text{HS—CH}_2)_n\text{—Si—[(O—(CH}_2)_m\text{CH}_3)]_3$$

wherein n represents an integer from 1 to 6 and wherein m represents an integer from 0 to 6. It is preferred for n to be an integer from 1 to 4 and is more preferred from n to be the integer 1, 2, or 3. It is preferred form to be an integer from 1 to 5 and is more preferred for n to represent the integer 1, 2, 3, 4, or 5. For example, it is preferred for the sulfur containing crosslinkable silane to be of the structural formula:

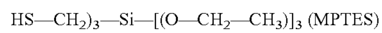

$$\text{HS—CH}_2)_3\text{—Si—[(O—CH}_2\text{—CH}_3)]_3 \text{ (MPTES)}$$

The hydrophobating silanes that can be used as silica coupling agents in accordance with this invention are typically of the formula:

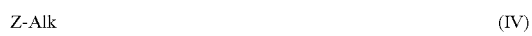

$$\text{Z-Alk} \quad \text{(IV)}$$

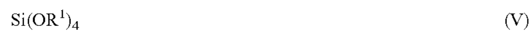

$$\text{Si(OR}^1)_4 \quad \text{(V)}$$

wherein Z is selected from the group consisting of:

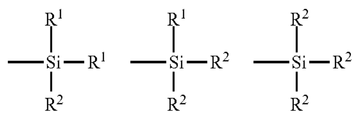

wherein $R^1$ is an alkyl group containing from 1 to 4 carbon atoms, a cyclohexyl group, or a phenyl group; wherein $R^2$ is an alkoxy group containing from 1 to 8 carbon atoms, or a cycloalkoxy group containing from 5 to 8 carbon atoms; wherein Alk is a divalent hydrocarbon of 1 to 18 carbon atoms and wherein n represents an integer from 2 to 8.

Non-limiting examples of suitable organosilicon compounds that can be used as the hydrophobating silica coupling agent include, but are not limited to, compounds and mixtures of compounds selected from diethyldichlorosilane, allylmethyldichlorosilane, methylphenyldichlorosilane, phenylethyldiethoxysilane, 3,3,3-trifluoropropylmethyldichlorosilane, trimethylbutoxysilane, sym-diphenyltetramethyldisiloxane, trivinyltrimethylcyclotrisiloxane, octamethylcyclotetrasiloxane, hexaethyldisiloxane, pentylmethyldichlorosilane, divinyldipropoxysilane, vinyldimethylchlorosilane, vinylmethyldichlorosilane, vinyldimethylmethoxysilane, trimethylchlorosilane, trimethylmethoxysilane, trimethylethoxysilane, methyltrichlorosilane, methyltrimethoxysilane, methyltriethoxysilane, hexamethyldisiloxane, hexenylmethyldichlorosilane, hexenyldimethylchlorosilane, dimethylchlorosilane, dimethyldichlorosilane, dimethyldimethoxysilane, dimethyldiethoxysilane, hexamethyldisilazane, trivinyltrimethylcyclotrisilazane, polydimethylsiloxanes comprising 3 to about 20 dimethylsiloxy units and trimethylsiloxy or hydroxydimethylsiloxy end blocked poly(dimethylsiloxane) polymers having an apparent viscosity within the range of from 1 to 1000 in mPas at 25° C.

In one embodiment of this invention certain organotitanium compounds can be utilized as the hydrophobating silica coupling agent. Non-limiting examples of suitable organotitanium compounds can include, but are not limited to, tetra($C_1$-$C_{18}$)alkoxy titanates, methyl triethoxy titanium (iv), methyl titanium (iv) triisopropoxide, methyl titanium (iv) tributoxide, methyl titanium (iv) tri-t-butoxide, isopropyl titanium (iv) tributoxide, butyl titanium (iv) triethoxide, butyl titanium (iv) tributoxide, phenyl titanium (iv) triisopropoxide, phenyl titanium (iv) tributoxide, phenyl titanium (iv) triisobutoxide, $[Ti(CH_2Ph)_3(NC_5H_{10})]$ and $[Ti(CH_2SiMe_3)_2(NEt_2)_2]$.

In another embodiment of this invention certain organozirconium compounds can be utilized as the hydrophobating silica coupling agent. Non-limiting examples of suitable organozirconium compounds that can include, but are not limited to, tetra($C_1$-$C_{18}$)alkoxy zirconates, phenyl zirconium (iv) trichloride, methyl zirconium (iv) trichloride, ethyl zirconium (iv) trichloride, propyl zirconium (iv) trichloride, methyl zirconium (iv) tribromide, ethyl zirconium (iv) tribromide, propyl zirconium (iv) tribromide, and chlorotripentyl zirconium (iv). In alternate non-limiting embodiments, zirconium compounds similar to those described above for the organotitanium compounds and vice-versa are also contemplated.

Some preferred hydrophobating silica coupling agents for use in the practice of this invention are of the structural formula:

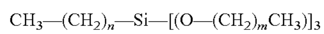

$$CH_3—(CH_2)_n—Si—[(O—(CH_2)_mCH_3)]_3$$

wherein n represents an integer from 0 to 18 and wherein m represents an integer from 0 to 12. It is preferred for m to be an integer from 1 to 4 and is more preferred from m to be the integer 1, 2, or 3. It is preferred for n to be an integer from 4 to 10 and is more preferred for n to represent the integer 5, 6, 7, 8, or 9. For example, a highly preferred hydrophobating silica coupling agent is of the structural formula:

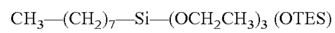

$$CH_3—(CH_2)_7—Si—(OCH_2CH_3)_3 \text{ (OTES)}$$

The total level of the silica coupling agents (both hydrophobating silanes and sulfur crosslinkable silanes) which are optionally incorporated into the rubber formulation will typically be within the range of 2.5 phf to 15 phf and will more typically be within the range of 6 phf to 15 phf. The total level of the silica coupling agents which are incorporated into the rubber formulation will preferably be within the range of 7 phf to 12 phf and will more preferably be within the range of 8 phf to 10 phf. In any case, the maximum level of sulfur crosslinkable silanes employed is 5 phf with the maximum level of crosslinkable silanes normally being within the range of 2 phf to 3 phf. In many cases the maximum level of crosslinkable silanes will be 2 phf, and in some cases the maximum level of crosslinkable silanes will be about 1.5 phf. It is normally preferred for the level of sulfur crosslinkable silanes utilized to be within the range of about 1 phf to 2.5 phf. In any case the level of crosslinkable silanes will be within the range of about 0.5 phf to 1.5 phf, 0.8 phf to 2.5 phf, or 1.5 phf to 3 phf.

In one embodiment of this invention, the weight ratio of the hydrophobating silanes to sulfur crosslinkable silanes will typically be within the range of 2:1 to 20:1 and will more typically within the range of 3:1 to 15:1. The weight ratio of the hydrophobating silanes to sulfur crosslinkable silanes will normally be within the range of 4:1 to 14:1 and is generally within the range of 5:1 to 12:1. The weight ratio of the hydrophobating silanes to sulfur crosslinkable silanes will preferably be within the range of 6:1 to 10:1 and will more preferably be within the range of 7:1 to 9:1.

The rubber formulations of this invention can contain fillers in addition to the rice husk ash silica filler. In fact, such rubber formulations typically contain carbon black in addition to the silica filler. Commonly employed carbon blacks may be used as a conventional filler in an amount ranging from 2 phr to 150 phr. The carbon blacks may have iodine absorptions ranging from 9 to 145 g/kg and DBP number ranging from 34 to 150 $cm^3$/100 g. Such types of carbon black are preferably characterized by an Iodine absorption ranging from 9 to 100 g/kg and a DBP number ranging from 34 to 140 $cm^3$/100 gram. Some representative examples of reinforcing type carbon blacks that can be employed in the rubber formulations of this invention include N326, N330, N332, N339, N343, N347, N351, N358, N375, N539, N550, N582, N650, N660, N683, N754, N762, N765, N774, and N787.

Other fillers may be used in the rubber composition including, but not limited to, particulate fillers including ultra-high molecular weight polyethylene (UHMWPE), crosslinked particulate polymer gels, and plasticized starch composite filler. Such other fillers may be used in an amount ranging from 1 phr to 30 phr and will typically be used at a level which is within the range of 4 phr to 20 phr.

It may readily be understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. In many cases microcrystalline waxes are used. Typical amounts of peptizers comprise about 0.1 to about 1 phr. Typical peptizers may be, for example, pentachlorothiophenol and dibenzamidodiphenyl disulfide.

Accelerators may be used to control the time and/or temperature required for vulcanization and to improve the properties of the vulcanizate. A single accelerator system may be used, i.e., primary accelerator. The primary accelerator(s) may be used in total amounts ranging from about 0.5 phr to about 8 phr. Combinations of a primary and a secondary accelerator may be used with the secondary accelerator being used in smaller amounts, such as from about 0.05 to about 5 phr, in order to activate and to improve the properties of the vulcanizate. Combinations of these accelerators may be expected to produce a synergistic effect on the final properties and are somewhat better than those produced by use of either accelerator alone.

Some non-limiting examples of suitable accelerator compositions include: benzothiazoles such as: 2-mercaptobenzothiazole, zinc 2-mercaptobenzothiazole, 2,2'-dithiobis-benzothiazole, 2-morpholinothiobenzothiazole, 2-(4-morpholinothio)-benzothiazole, 2-(4-morpholinodithio)-benzothiazole, 2-(4-morpholinothio)-5-methylbenzothiazole, 2-(4-morpholinothio) chlorobenzothiazole, 2-(2,6-dimethyl-4-morpholinothio)-benzothiazole, 2-(3,6-dimethyl morpholinothio)-benzothiazole, 2,2'-dibenzothiazole disulfide, and 2-mercaptobenzothiazyl disulfide; benzothiazole sulfenamides such as: N-cyclohexyl-2-benzothiazole sulfenamide, N-tert-butyl-2-benzothiazole sulfenamide, N,N'-dicyclohexyl-2-benzothiazole sulfenamide, N,N-diisopropyl-2-benzothiazole sulfenamide, N,N-diethyl-2-benzothiazole sulfenamide, N-oxydiethylene-2-benzothiazole sulfenamide, and N-oxydiethylene thiocarbamyl-N-oxydiethylene sulfenamide; dithiocarbamates such as: bismuth dimethyldithiocarbamate, copper dimethyldithiocarbamate, cadmium diethyldithiocarbamate, lead diamyldithiocarbamate, lead dimethyldithiocarbamate, selenium diethyldithiocarbamate, selenium dimethyldithiocarbamate, tellurium diethyldithiocarbamate, zinc dimethyldithiocarbamate, zinc diethyldithiocarbamate, zinc diamyldithiocarbamate, zinc di-n-butyldithiocarbamate, zinc dimethylpentamethylenedithiocarbamate, piperidinium pentamethylene dithiocarbamate, 2-benzothiazyl-N,N-diethyldithiocarbamate, and dimethylammonium dimethyldithiocarbamate; thiomorpholines such as: 4,4'-dithiodimorpholine, 4-mercaptomorpholine, 4-mercapto-2,6-dimethylmorpholine, 4-[(4-morpholinylthio)thixomethyl] morpholine, 2,6-dimethylmorpholine disulfide, methyl morpholine disulfide, propyl 2,6-dimethylmorpholine disulfide, alkyl morpholine disulfide, and phenyl morpholine disulfide; thioureas such as: trimethylthiourea, 1,3-diethylthiourea, 1,3-dibutylthiourea, N,N'-dibutylthiourea, dimethylethylthiourea, diphenylthiourea, and tetramethylthiourea; xanthates such as: sodium isopropylxanthate, zinc isopropylxanthate, and zinc dibutylxanthate; thiuramsulfides such as: tetramethylthiuram monosulfide, tetramethylthiuram disulfide, tetraethylthiuram disulfide, tetrabutylthiuram disulfide, tetrabenzylthiuram disulfide, dipentamethylenethiuram tetrasulfide, dimethyldiphenylthiuram disulfide, and dipentamethylenethiuram monosulfide; amines such as: cyclohexylethylamine, dibutylamine, acetaldehyde-aniline condensation products, heptaldehyde-aniline condensation products; and guanidines, such as: N,N'-diphenylguanidine, N,N'-di-o-tolylguanidine, orthotolylbiguanidine, N,N',N"-triphenylguandine, and blends of diarylguanidines.

In addition, delayed action accelerators may be used which are not affected by normal processing temperatures, but produce a satisfactory cure at ordinary vulcanization temperatures. Vulcanization retarders might also be used. Suitable types of accelerators that are typically employed include amines, disulfides, guanidines, thioureas, thiazoles, thiurams, sulfenamides, dithiocarbamates and xanthates.

The ingredients used in making the rubber formulations of this invention are typically mixed in at least two stages; namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur containing organosilicon, and carbon black, if used, are mixed in one or more non-productive mix stages. The sulfur-vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 1 minute to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The rubber formulations of this invention can be utilized in making a wide variety of rubber products, including tires, hoses, air springs, power transmission belts, conveyor belts, windshield wiper blades, bushings, and the like. These rubber formulations are of particular benefit when used in making tire tread compounds. Such tires can be pneumatic race tires, passenger tires, run-flat tires, aircraft tires, agricultural tires, earthmover tires, off-the-road tires, medium truck tires, or any other type of pneumatic or non-pneumatic tire. In one example, the tire is a passenger tire or a truck tire. The tire can also be a radial ply tire or a bias ply tire.

Vulcanization of the example pneumatic tire may generally be carried out at conventional temperatures ranging from about 100° C. to 200° C. Any of the usual vulcanization processes may be used such as heating in a press or mold and/or heating with superheated steam or hot air. Such tires can be built, shaped, molded and cured by various methods which are known and are readily apparent to those having skill in such art.

This invention is illustrated by the following examples which are merely for the purpose of illustration and are not to be regarded as limiting the scope of the invention or the manner in which it can be practiced. Unless specifically indicated otherwise, parts and percentages are given by weight.

Example 1

A series of rubber formulations were compounded with rice husk ash silica and compared to a rubber formulation made with a conventional reinforcing-silica (Zeosil® 1165MP micropearl silica from Solvay). After being compounded the samples were cured and evaluated to compare the properties of cured rubber samples. The compound made in Comparative Example 1 was compounded with the Zeosil® 1165MP micropearl silica and the compounds made in Examples 2 and 3 were made using rice husk ash silica. These rubber formulations were made by first making non-productive compounds by mixing the ingredients delineated in Table 1.

TABLE 1

Nonproductive Rubber Formulations

| Ingredients | Levels |
|---|---|
| Budene ® 1207 High Cis-1,4-Polybutadiene Rubber | 30 phr |
| Functionalized Styrene-Butadiene Rubber | 70 phr |
| N330 Carbon Black | 5 phr |
| Si266 Silica Coupling Agent | 6.5 |
| Stearic Acid | 3 phr |
| Wax | 1.5 phr |
| Zeosil ® 1165MP Silica or Rice Husk Ash Silica | 65 phr |
| Naphthenic Processing Oil | 20 phr |
| 6-PPD | 2.5 |

Then, productive rubber formulations were made by mixing the following ingredients specified in Table 2 into the nonproductive rubber formulations:

TABLE 2

Additional Ingredients to Make Productive Rubber Formulations

| Ingredients | Levels |
|---|---|
| Zinc Oxide | 1.5 phr |
| Sulfur | 1.5 phr |
| CBS Accelerator | 1.5 phr |
| Diphenyl Guanidine | 1.9 phr |
| PPD | 0.7 phr |

The results of physical testing are reported in Table 3. The values reported were normalized to the results obtained in Control Example 1.

TABLE 1

(The values reported were normalized to the values attained in Comparative Example 1.)

| | Comparative 1 | Example 2 | Example 3 |
|---|---|---|---|
| | | Coupling Agent | |
| | Zeosil ® 1165MP | RHA Silica[1] | RHA Silica[2] |
| MDR | | | |
| Final Torque | 100 | 90 | 90 |
| Maximum Torque | 100 | 91 | 92 |
| Minimum Torque | 100 | 107 | 109 |
| Delta Torque | 100 | 89 | 90 |
| T2 | 100 | 68 | 95 |
| T25 | 100 | 66 | 83 |
| T90 | 100 | 58 | 67 |
| TENSILE PROPERTIES (T/E INSTRON) | | | |
| 10% Modulus | 100 | 100 | 109 |
| 100% Modulus | 100 | 101 | 106 |
| 300% Modulus | 100 | 106 | 113 |
| Tensile Stress (Max.) | 100 | 99 | 109 |
| Tensile Strain (Max.) | 100 | 96 | 99 |
| Energy at Maximum | 100 | 99 | 107 |
| RPA (Uncured) | | | |
| G' @ 0.833 Hz | 100 | 107 | 111 |
| RPA (Cured) | | | |
| G' @ 1% | 100 | 83 | 83 |
| G' @ 10% | 100 | 88 | 90 |
| tan δ 10%, 45° C., 10 Hz | 100 | 89.3 | 86.7 |

[1]Rice Husk Ash Silica, BET surface area 160 $m^2/g$ and Hg porosimetry of 151 $m^2/g$
[2]Rice Husk Ash Silica, BET surface area 141 $m^2/g$ and Hg porosimetry of 144 $m^2/g$ While certain representative embodiments and details have been shown for the purpose of illustrating the subject invention, it will be apparent to those skilled in this art that various changes and modifications can be made therein without departing from the scope of the subject invention.

What is claimed is:

1. A sulfur curable rubber formulation which is comprised of (1) a styrene-butadiene rubber, (2) a high cis-1,4-polybutadiene rubber, (3) rice husk ash silica, wherein the rice husk ash silica has a BET nitrogen surface area which is within the range of 120 $m^2$/gram to 300 $m^2$/gram, a CTAB surface area which is within the range of 100 $m^2$/gram to 300 $m^2$/gram, a ratio of BET to CTAB surface areas which is with the range of 0.8 to 1.3, a bulk density which is within the range of 120 grams/liter to 200 grams/liter, a loss on ignition which is within the range of 3.0% to 6.0%, and a heat loss which is within the range of 4.0% to 7.0%, (4) 2 phf to 15 phf of a silica coupling agent which comprises a hydrophobating silane and a sulfur crosslinkable silane and wherein the sulfur crosslinkable silane is present in the amount from 0.5 to 5 phf and the weight ratio of the hydrophobating silane to the sulfur crosslinkable silane ranges from 4:1 to 20:1; wherein the sulfur curable rubber formulation is void of titanium compounds.

2. The sulfur curable rubber formulation of claim 1 wherein said sulfur curable rubber formulation is further comprised of sulfur.

3. The sulfur curable rubber formulation of claim 1 wherein the styrene-butadiene rubber is functionalized with carboxyl groups.

4. The sulfur curable rubber formulation of claim 1 wherein the sulfur crosslinkable silane is present at a level which is within the range of 1 phf to 3 phf; wherein total level of the hydrophobating silane and the sulfur crosslinkable silanes is within the range of 6 phf to 15 phf, and wherein the rice husk ash silica is present at a level of about 65 parts by weight per 100 parts by weight of rubber.

5. The sulfur curable rubber formulation of claim 1 wherein the hydrophobating silane consists of organosilicon compounds.

6. The sulfur curable rubber formulation of claim 1 wherein said sulfur curable rubber formulation is void of natural rubber and synthetic polyisoprene rubber.

7. The sulfur curable rubber formulation of claim 1 wherein the weight ratio of the hydrophobating silane to the sulfur crosslinkable silane is within the range of 5:1 to 12:1.

8. The sulfur curable rubber formulation of claim 1 wherein the weight ratio of the hydrophobating silane to the crosslinkable silane is within the range of 7:1 to 9:1.

9. The sulfur curable rubber formulation of claim 1 wherein the sulfur curable rubber formulation is void of rubbery polymers other than the styrene-butadiene rubber and the a high cis-1,4-polybutadiene rubber, wherein the styrene-butadiene rubber is present at a level which is within the range of 55 weight percent to 90 weight percent, and wherein the a high cis-1,4-polybutadiene rubber is present at a level which is within the range of 10 weight percent to 45 weight percent, based upon the total weight of rubber in the formulation, and wherein the styrene-butadiene rubber is functionalized with carboxyl groups.

10. The sulfur curable rubber formulation of claim 1 wherein the sulfur crosslinkable silane is of the structural formula:

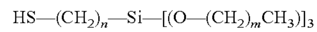

$HS—(CH_2)_n—Si—[(O—(CH_2)_mCH_3)]_3$ wherein n represents an integer from 1 to 6 and wherein m represents an integer from 0 to 6.

11. The sulfur curable rubber formulation of claim 10 wherein n represents the integer 3 and wherein m represents the integer 1.

12. The sulfur curable rubber formulation of claim 1 wherein the hydrophobating silane is of the structural formula:

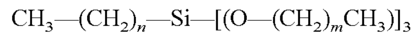

$CH_3—(CH_2)_n—Si—[(O—(CH_2)_mCH_3)]_3$ wherein n represents an integer from 0 to 18 and wherein m represents an integer from 0 to 6.

13. The sulfur curable rubber formulation of claim 12 wherein n represents the integer 7 and wherein m represents the integer 1.

14. The sulfur curable rubber formulation of claim 1 wherein the hydrophobating silane consists of organozirconium compounds.

15. The sulfur curable rubber formulation of claim 14 wherein the organozirconium compound is selected from the group consisting of tetra (C1-C18) alkoxy zirconates, phenyl zirconium (iv) trichloride, methyl zirconium (iv) trichloride, ethyl zirconium (iv) trichloride, propyl zirconium (iv) trichloride, methyl zirconium (iv) tribromide, ethyl zirconium (iv) tribromide, propyl zirconium (iv) tribromide, and chlorotripentyl zirconium (iv).

* * * * *